(12) United States Patent
Zhu et al.

(10) Patent No.: US 10,488,500 B2
(45) Date of Patent: Nov. 26, 2019

(54) SYSTEM AND METHOD FOR ENHANCING IMAGE RESOLUTION

(71) Applicant: SZ DJI TECHNOLOGY CO., LTD., Shenzhen (CN)

(72) Inventors: Zhenyu Zhu, Shenzhen (CN); Cong Zhao, Shenzhen (CN); Ketan Tang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 101 days.

(21) Appl. No.: 15/793,284

(22) Filed: Oct. 25, 2017

(65) Prior Publication Data

US 2018/0059225 A1    Mar. 1, 2018

Related U.S. Application Data

(63) Continuation of application No. PCT/CN2015/078096, filed on Apr. 30, 2015.

(51) Int. Cl.
| | |
|---|---|
| *G01S 7/486* | (2006.01) |
| *G01S 17/02* | (2006.01) |
| *G01S 17/10* | (2006.01) |
| *G01S 17/89* | (2006.01) |
| *G06T 3/40* | (2006.01) |
| *G06T 5/50* | (2006.01) |

(52) U.S. Cl.
CPC .......... *G01S 7/4865* (2013.01); *G01S 17/023* (2013.01); *G01S 17/102* (2013.01); *G01S 17/89* (2013.01); *G06T 3/4076* (2013.01); *G06T 5/50* (2013.01)

(58) Field of Classification Search
CPC .... G01S 17/023; G01S 17/102; G01S 7/4865; G01S 17/89; G06T 5/50; G06T 3/4076
See application file for complete search history.

(56) References Cited

U.S. PATENT DOCUMENTS

| | | | |
|---|---|---|---|
| 8,718,326 B2 | 5/2014 | Yoon et al. | |
| 8,878,901 B2 | 11/2014 | Meinherz | |
| 2011/0210969 A1* | 9/2011 | Barenbrug | ............... G06T 7/507 345/419 |
| 2014/0138519 A1* | 5/2014 | Wang | ...................... G01S 17/89 250/206.1 |

(Continued)

FOREIGN PATENT DOCUMENTS

| | | |
|---|---|---|
| CN | 101556696 A | 10/2009 |
| CN | 102609941 A | 7/2012 |

(Continued)

OTHER PUBLICATIONS

The World Intellectual Property Organization (WIPO) International Search Report for PCT/CN2015/078096 dated Sep. 25, 2015 8 Pages.

(Continued)

*Primary Examiner* — Vincent Rudolph
*Assistant Examiner* — Pinalben Patel
(74) *Attorney, Agent, or Firm* — Anova Law Group, PLLC

(57) ABSTRACT

A method for enhancing image resolution includes obtaining one or more images of a scene. The one or more images are associated with a first depth map. The method further includes determining a second depth map of the scene based upon the one or more images. The second depth map has a higher resolution than the first depth map.

16 Claims, 11 Drawing Sheets

(56) References Cited

U.S. PATENT DOCUMENTS

2015/0104074 A1* 4/2015 Vondran, Jr. .......... H04N 13/133
382/106

FOREIGN PATENT DOCUMENTS

| CN | 102685402 A | 9/2012 |
|---|---|---|
| CN | 103337069 A | 10/2013 |
| CN | 103663084 A | 3/2014 |
| CN | 103955954 A | 7/2014 |
| CN | 104115192 A | 10/2014 |
| CN | 104471639 A | 3/2015 |
| CN | 104519343 A | 4/2015 |
| EP | 2863336 A2 | 4/2015 |
| WO | 2014044569 A1 | 3/2014 |
| WO | 2014154839 A1 | 10/2014 |
| WO | 2014164401 A1 | 10/2014 |

OTHER PUBLICATIONS

Thomas Kohler et al., ToF Meets RGB: Novel Multi-Sensor Super Resolution for Hybrid 3-D Endoscopy, Medical Image Computing and Computer-Assisted Intervention, 2013, pp. 139-146, Springer-Verlag Berlin Heidelberg.

Victor Castaneda et al., SLAM combining ToF and High-Resolution cameras, Applications of Computer Vision, 2011 IEEE Workshop on IEEE, 7 pages.

James Davis et al., Time-of-Flight Imaging: Algorithms, Sensors and Applications, Dagstuhl Reports, 2013, pp. 79-104., vol. 2, Issue 10, Dagstuhl Publishing, Germany.

Michael Van Den Bergh and Luc Van Gool, Combining RGB and ToF Cameras for Real-time 3D Hand Gesture Interaction, Applications of Computer Vision, 2011 IEEE Workshop on IEEE, 7 pages.

Jaesik Park et al., High Quality Depth Map Upsampling for 3D-TOF Cameras, Computer Vision, 2011 IEEE International Conference on on Computer Vision, pp. 1623-1630.

Thorsten Ringbeck and Bianca Hagebeuker, A 3D Time of Flight Camera for Object Detection, 2007, 10 pages.

Dirk Holz et al., Real-Time Plane Segmentation using RGB-D Cameras, RoboCup 2011, 2012, pp. 306-317, Springer-Verlag Berlin Heidelberg.

Tak-Wai Hui and King Ngi Ngan, Motion-Depth: RGB-D Depth Map Enhancement with Motion and Depth in Complement, Proceedings of the IEEE Conference on Computer Vision and Pattern Recognition, 2014, pp. 4321-4328.

* cited by examiner

SYSTEM AND METHOD FOR ENHANCING IMAGE RESOLUTION

CROSS-REFERENCE TO RELATED APPLICATION

This is a continuation application of International Application No. PCT/CN2015/078096, filed on Apr. 30, 2015, the entire contents of which are incorporated herein by reference.

FIELD

The present disclosure relates generally to digital imaging and more specifically, but not exclusively, to, systems and methods of enhancing image resolution.

BACKGROUND

A Time-of-Flight (or "ToF") camera is a range imaging camera based on measuring a Time-of-Flight of a light signal emitting from a camera toward a scene. Light reflected back from the scene has a delayed phase relative to the emitted light signal. The TOE camera relies on measuring the phase shift of the reflected light relative to the emitted light to calculate a distance between the camera and the scene to achieve environmental depth perception.

ToF cameras normally include image sensors to sense light reflected from the environment. The image sensors have high speed in image capturing and can perceive depth. The speed and depth perception of ToF cameras would have made such cameras good candidates for functions such as collision avoidance and navigation for small robotic toys or other high tech consumer products. The ToF cameras, however, have low image resolution relative to regular cameras, such as Red Green Blue ("RGB") video cameras, which resolution limits such uses.

A need therefore exists for an improved. ToF imaging system and method with better resolution to enhance the depth recognition of ToF imaging systems.

SUMMARY

In accordance with a first aspect disposed herein, there is set forth a method for enhancing image resolution, comprising:

obtaining one or more images of a scene, the one or more images being associated with a first depth map; and determining a second depth map of the scene based upon the one or more images, wherein the second depth map has a higher resolution than the first depth map.

Exemplary embodiments of the disclosed methods further comprise obtaining a first image of the scene, wherein the first image comprises a depth map.

In an exemplary embodiment of the disclosed methods, obtaining the first image comprises capturing the first image via a first imaging device.

Exemplary embodiments of the disclosed methods further comprise determining the first depth map and an intensity image associated with the first image based upon the first image.

In an exemplary embodiment of the disclosed methods, the first imaging device comprises a Time of Flight ("ToF") camera.

In an exemplary embodiment of the disclosed methods, obtaining comprises capturing a second image of the scene, wherein the second image comprises a Red, Green and Blue ("RGB") image.

In an exemplary embodiment of the disclosed methods, capturing the second image comprises capturing the second image via a second imaging device.

In an exemplary embodiment of the disclosed methods, the second imaging device comprises an RGB camera.

Exemplary embodiments of the disclosed methods further comprise calibrating at least one of the first imaging device and the second imaging device.

In an exemplary embodiment of the disclosed methods, calibrating comprises:

obtaining a transformation relationship between coordinates of the first and the second imaging devices.

Exemplary embodiments of the disclosed methods further comprise:

mapping one or more pixel of the second image to the first image.

In an exemplary embodiment of the disclosed methods, determining comprises generating the second depth map via the first image of the scene and the second image of the scene.

In an exemplary embodiment of the disclosed methods, generating the second depth map further comprises at least one of converting the first image into an intensity image associated with the first image and a first depth map and converting the second image into a grayscale image associated with the second image.

In an exemplary embodiment of the disclosed methods, generating the second depth map further comprises calculating a relationship between the intensity image associated with the first image and the grayscale image associated with the second image; and enhancing a resolution of the first depth map based upon the calculating.

In an exemplary embodiment of the disclosed methods, calculating comprises:

analyzing differences between each image block of the intensity image associated with the first image and each corresponding image block of the grayscale image associated with the second image; and producing a degradation model between each of the image blocks of the intensity image associated with the first image and each of the corresponding image blocks of the gray scale image associated with the second image.

In an exemplary embodiment of the disclosed methods, enhancing comprises applying a transformation matrix being an inverse of a degradation model to each image block of the first depth map.

In accordance with another aspect disclosed herein, there is set forth an apparatus for imaging resolution enhancing, comprising:

one or more processors individually or collectively configured for obtaining one or more images of a scene and for determining a second depth map of the scene based upon the one or more images, wherein the one or more images are associated with a first depth map and the second depth map has a higher resolution than the first depth map.

Exemplary embodiments of the disclosed apparatus further comprise a first imaging device and a second imaging device for capturing the one or more images of the scene.

In an exemplary embodiment of the disclosed apparatus, the one or more processors are configured to automatically generate a second depth map of the scene for the first imaging device.

In other exemplary embodiments of the disclosed apparatus, the one or more processors are configured to automatically calibrate at least one of the first imaging device and the second imaging device.

In other exemplary embodiments of the disclosed apparatus, the one or more processors are configured to automatically obtain a transformation relationship between coordinates of the first and second imaging devices.

In other exemplary embodiments of the disclosed apparatus, the first imaging device is configured to obtain a first image of the scene, and wherein the second imaging device is configured to obtain a second image of the scene.

In other exemplary embodiments of the disclosed apparatus, the one or more processors are configured to automatically map one or more pixels of the second image to one or more pixels of the first image.

In other exemplary embodiments of the disclosed apparatus, the first imaging device is configured to automatically convert the first image into an intensity image associated with the first image and a first depth map and configured to automatically convert the second image into a grayscale image associated with the second image.

In other exemplary embodiments of the disclosed apparatus, the one or more processors are configured to automatically calculate a relationship between the intensity image and the grayscale image.

In other exemplary embodiments of the disclosed apparatus, the one or more processors are configured to automatically analyze a difference between each image block of the intensity image associated with the first image and each corresponding image block of the grayscale image associated with the second image.

In other exemplary embodiments of the disclosed apparatus, the one or more processors are configured to automatically produce a degradation model between each image block of the intensity image associated with the first image and each corresponding image block of the grayscale image associated with the second image.

In other exemplary embodiments of the disclosed apparatus, the one or more processors are configured to automatically enhance the resolution of the first depth map by applying a transformation matrix, which is an inverse of the degradation model, to the first depth map.

In other exemplary embodiments of the disclosed apparatus, either of the first and second imaging device is a camera or a sensor.

In other exemplary embodiments of the disclosed apparatus, the first and second imaging devices are selected from a group consisting of Red, Green and Blue ("RGB") cameras, laser cameras, infrared cameras, ultrasound cameras and Time-of-Flight ("ToF") cameras.

In other exemplary embodiments of the disclosed apparatus, the first imaging device comprises one or more ToF cameras.

In other exemplary embodiments of the disclosed apparatus, the second imaging device comprises one or more RGB cameras.

In other exemplary embodiments of the disclosed apparatus, the one or more RGB cameras comprise one or more RGB video cameras.

In other exemplary embodiments of the disclosed apparatus, each of the one or more RGB cameras comprises at least a lens receiving the light from the scene; a filter for filtering the received light; an image sensor for generating electronic signals from the filtered light; and a processor for performing an operation on the electronic signals.

In other exemplary embodiments of the disclosed apparatus, the first and second imaging devices and the one or more processors are installed aboard a mobile platform.

In other exemplary embodiments of the disclosed apparatus, the mobile platform is an Unmanned Aerial Vehicle.

In other exemplary embodiments of the disclosed apparatus, the mobile platform is a robot.

In other exemplary embodiments of the disclosed apparatus, at least one of the ToF cameras comprises at least an illumination unit for directing light towards a scene, a lens for receiving the light from the scene, a filter for filtering the received light, an image sensor for generating electronic signals from the filtered light and a processor for performing an operation on the electronic signals.

In other exemplary embodiments of the disclosed apparatus, at least one of the ToF cameras further comprises at least a memory for storing a result from the operation and a display for presenting the result.

In other exemplary embodiments of the disclosed apparatus, the illumination unit comprises a LED or a laser diode.

In other exemplary embodiments of the disclosed apparatus, the filter comprises a band-pass filter.

In other exemplary embodiments of the disclosed apparatus, the illumination unit emits infrared or near infrared light, and wherein the band-pass filter passes infrared or near-infrared light.

In other exemplary embodiments of the disclosed apparatus, each of the one or more RGB cameras further comprises at least a memory for storing a result from the operation; and a display for presenting the result.

In other exemplary embodiments of the disclosed apparatus, the filter is a green filter.

In other exemplary embodiments of the disclosed apparatus, the filter is a red filter.

In other exemplary embodiments of the disclosed apparatus, the filter is a blue filter.

In accordance with another aspect disclosed herein, there is set forth an imaging system configured to automatically perform the process for enhancing image resolution in accordance with any one of above methods.

In accordance with another aspect disclosed herein, there is set forth a computer program product comprising instructions for enhancing image resolution in accordance with any one of above methods.

Figure 1:
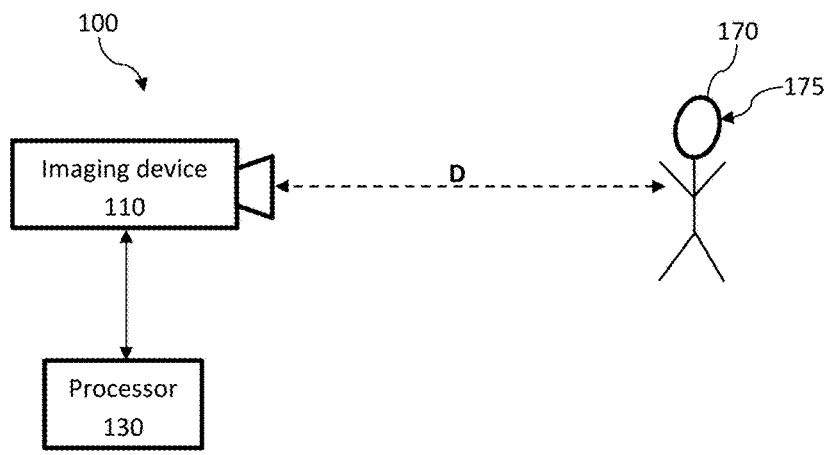
FIG. 1 is an exemplary top-level diagram illustrating an embodiment of an imaging apparatus with enhanced resolution.

It should be noted that the figures are not drawn to scale and that elements of similar structures or functions are generally represented by like reference numerals for illustrative purposes throughout the figures. It also should be noted that the figures are only intended to facilitate the description of the exemplary embodiments. The figures do not illustrate every aspect of the described embodiments and do not limit the scope of the present disclosure.

DETAILED DESCRIPTION OF THE EMBODIMENTS

Since currently-available ToF imaging cameras have low image resolution, an improved imaging system and method that provide higher image resolution can prove desirable and provide a basis for a wide range of applications such as collision avoidance, navigation or other functions for mobile platforms such as Unmanned Aerial Vehicles ("UAVs"), robots, and the like. The improved imaging system and method advantageously provide enhanced resolution for depth maps, thereby making collision avoidance and navigation more effective. These results can be achieved, according to one embodiment disclosed herein, by imaging apparatus 100 as illustrated in FIG. 1.

Turning to FIG. 1, an imaging apparatus 100 with enhanced resolution is shown as comprising an imaging device 110, which is operably connected with a processor 130. The imaging device 110 is shown as facing an object 170 in a scene 175. The imaging device 110 can capture images of the scene 175 and can generate image data from the captured images. The imaging device 110 can transmit the image data to the processor 130. The processor 130 can receive and process the image data and to create one or more depth maps. The depth maps can have predetermined image resolutions that are higher than the image resolutions of the captured images.

Figure 2:
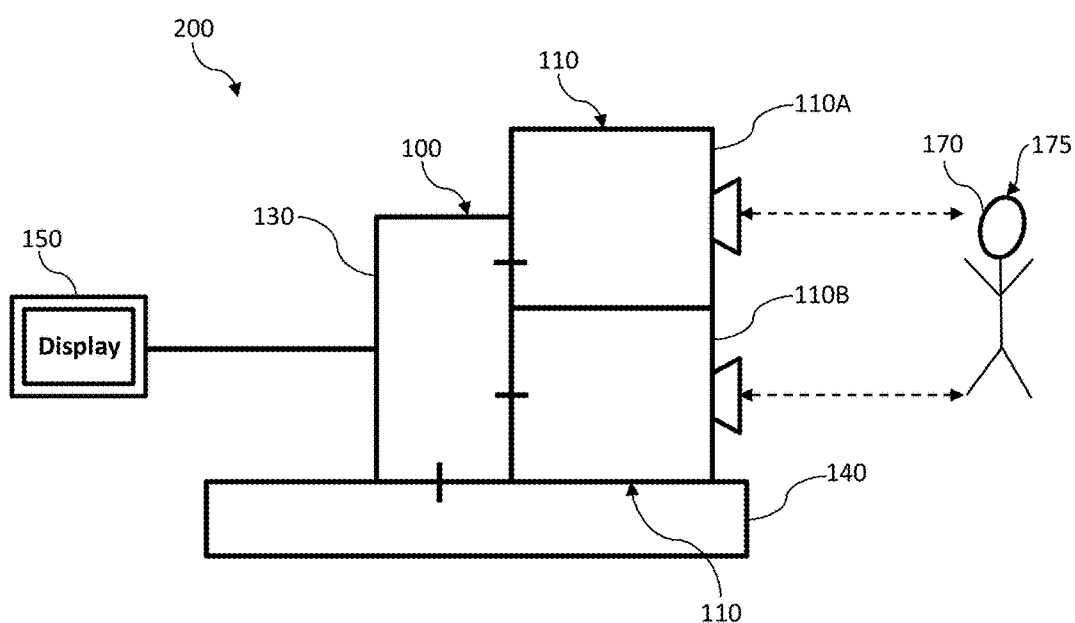
FIG. 2 is an exemplary top-level diagram illustrating an alternative embodiment of the imaging apparatus of FIG. 1, wherein the imaging apparatus includes first and second imaging devices.

Although shown and described as comprising a single imaging device with reference to FIG. 1 for purposes of illustration only, the imaging apparatus 100 can comprise more than one imaging device 110. As shown in FIG. 2, for example, the imaging apparatus 100 can have two imaging devices, such as a first imaging device 110A and a second imaging device 110B. The second imaging device 110B can be separated from, or at least partially integrated with, the first imaging device 110A. The first imaging device 110A and the second imaging device 110B can be operably connected. Both the first imaging device 110A and the second imaging device 110B can be operably connected to the processor 130.

The imaging apparatus 100 can include any suitable number, type and/or configuration of the imaging devices, s as the first and second imaging devices 110A, 110B, including but not limited to, laser cameras, infrared cameras, ultrasound cameras and Time-of-Flight ("ToF") cameras.

Without limitation, the processor 130 can include one or more general purpose microprocessors, for example, single or multi-core processors, application-specific integrated circuits, application-specific instruction-set processors, graphics processing units, physics processing units, digital signal processing units, coprocessors, network processing units, audio processing units, encryption processing units, and the like. The processor 130 can be configured to perform any of the methods described herein, including but not limited to, a variety of operations relating to imaging processing. In some embodiments, the processor 130 can include specialized hardware for processing specific operations relating to obstacle detection and avoidance—for example, processing time-of-flight data, processing ultrasound data, determining an obstacle distance based on collected data, and controlling a mobile platform (not shown) based on the determined distance.

In some embodiments, the processor 130 can be located in physical proximity to the first and second imaging devices 110A, 110B. In such cases, the processor 130 and the first and second imaging devices 110A, 110B can be configured to communicate locally, for example, using hardware connectors and/or buses. An advantage of local communication is that transmission delay can be reduced to facilitate real-time image processing.

In FIG. 2, an optional mobile platform 140 and/or an optional display 150 can be combined with imaging apparatus 100 to create a mobile system 200.

The mobile platform 140 can include, but are not limited to, a bicycle, automobile, truck, ship, boat, train, helicopter, aircraft, Unmanned Aerial Vehicle ("UAV") or an Unmanned Aerial System ("UAS"), robot, various hybrids thereof, and the like. The display 150 can be any type of display, including but not limited to a television, computer monitor, smart phone, tablet, smart wearable, various combinations thereof, and the like.

The processor 130 can be operably connected to the display 150. The mobile platform 140 can move around the environment. The display 150 can present images processed by the processor 130. The processor 130 can also be operably connected to the mobile platform 140. The first imaging device 110A, the second imaging device 110B, the processor 130 and the display 150 can all physically be connected to the mobile platform 140 and can move along with the mobile platform 140. The processor 130 can operably be connected to the mobile platform 140, thus can provide instructions to the mobile platform 140 based on analysis conducted by the processor 130 to the images captured by the first and second imaging devices 110A, 110B. The processor 130 can also be operably connected to the display 150 thus an operator of the imaging apparatus 100 can watch the images captured and processed by the imaging apparatus 100.

Additionally and/or alternatively, the mobile system 200 can include one or more additional hardware components (not shown), as desired. Exemplary additional hardware components can include, but are not limited to, a memory (not shown) and/or one or more input/output interfaces. Exemplary examples of the memory can be a random access memory ("RAM"), static RAM, dynamic RAM, read-only memory ("ROM"), programmable ROM, erasable programmable ROM, electrically erasable programmable ROM, flash memory, secure digital ("SD") card, and the like. Exemplary input/out interfaces can be a universal serial bus (USB), digital visual interface ("DVI"), display port, serial ATA ("SATA"), IEEE 1394 interface (also known as FireWire), serial, video graphics array (VGA), super video graphics array ("SVGA"), small computer system interface ("SCSI"), high-definition multimedia interface ("HDMI"), audio ports, and/or proprietary input/output interfaces, and the like. One or more input/output devices (not shown), including but not limited to, buttons, a keyboard, keypad, trackball, displays, and a monitor, can also be included in the mobile system 200, as desired.

Figure 3:
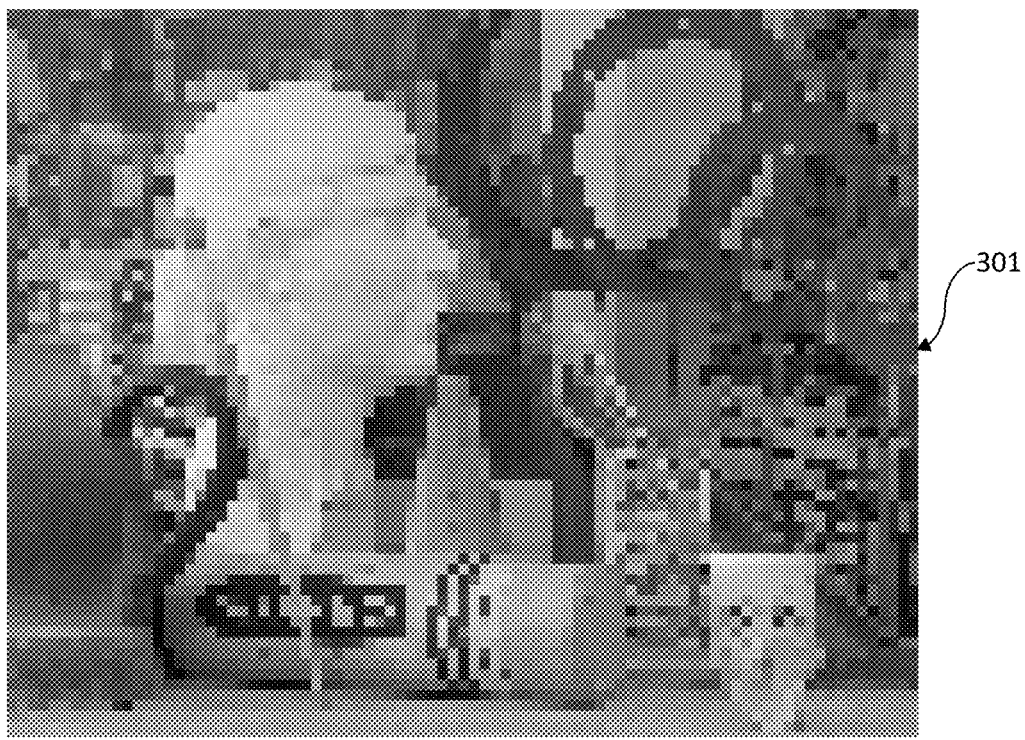
FIG. 3 is a low-resolution exemplary intensity image associated with the first image of a scene generated from the first imaging device of FIG. 2.
Figure 4:
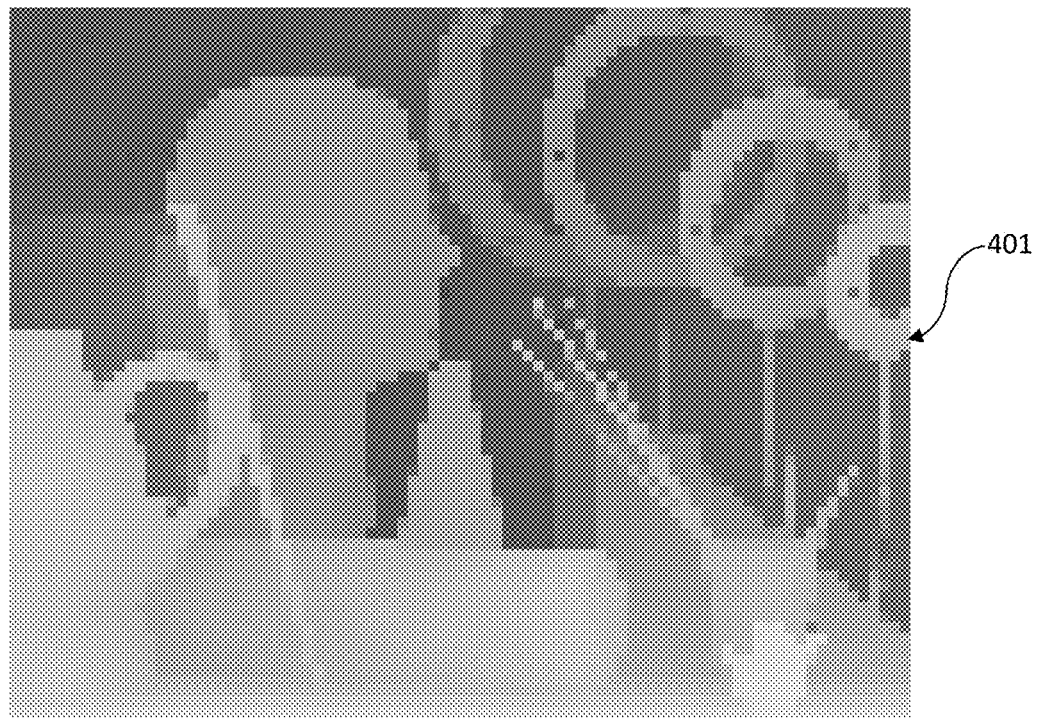
FIG. 4 is an exemplary low-resolution depth map of the scene generated from the first imaging device of FIG. 2.
Figure 6:
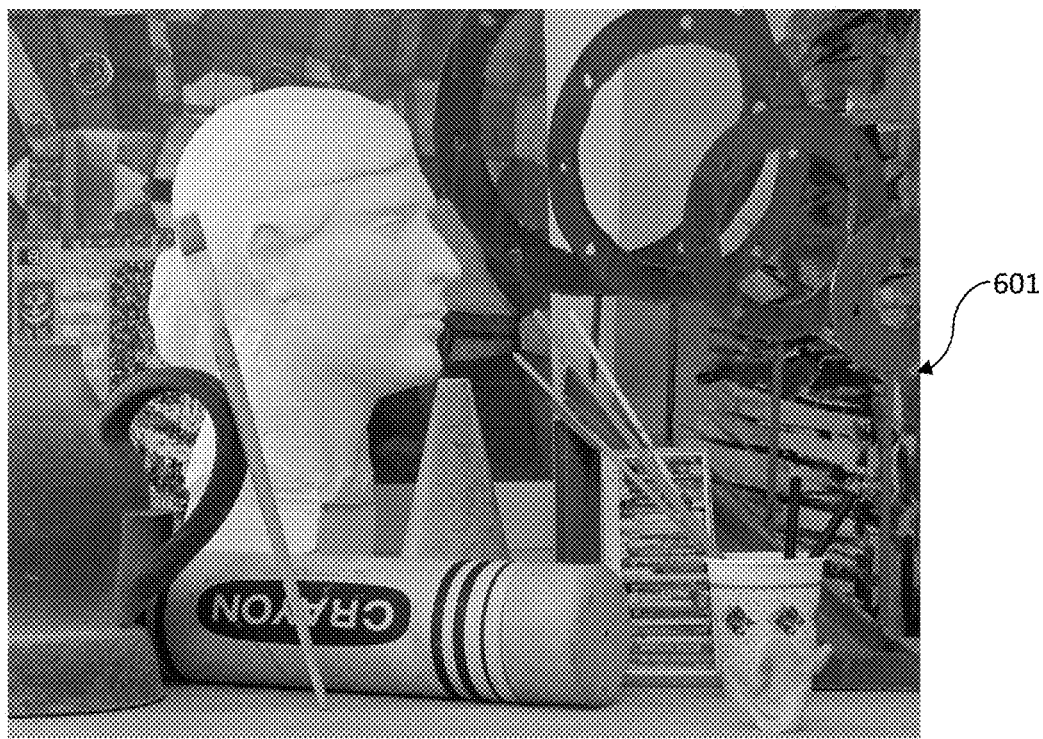
FIG. 6 is an exemplary high-resolution grayscale image of the scene generated from the image of FIG. 5.

The first imaging device 110A can produce low resolution intensity images, such as an intensity image 301 (shown in FIG. 3), which is associated with a first image, and/or low resolution depth maps, such as a first depth map 401 (shown in FIG. 4). The second imaging device 110B can produce grayscale images with higher resolution that the intensity images, such as a grayscale image 601 (shown in FIG. 6), which is associated with a second image. The first imaging device 110A and the second imaging device 110B can be operably connected such that the coordinates of the first and second imaging devices 110A, 110B can be calibrated so that all the images captured by the first and second imaging devices 110A, 110B can adopt the coordinates of one device, such as the first imaging device 110A. The processor 130 can calculate a difference between the resolutions of the intensity image 301 generated from the first imaging device 110A and the grayscale image 601 generated from the second imaging device 110B. The processor 130 can generate a degradation model from the intensity and grayscale images 301, 601 and/or generate higher resolution depth maps than and based on the first depth map 401 from the first imaging device 110A.

In some embodiments, the first imaging device 110A can be a time-of-flight ("ToF") camera, the second imaging device 110B can be a RGB camera, and the processor 130 can be a special processor that is custom-designed and made for the imaging apparatus 100.

The ToF camera can be a class of scanner-less Light Detection and Ranging ("LIDAR") device, in which the scene 175 can be captured in its entirety with each laser (or light) pulse as opposed to point-by-point with a laser beam such as in scanning LIDAR systems. There are several different types of ToF cameras, including range gated ToF cameras, phase shift Direct ToF cameras, and Photonic Mixer Devices.

An image captured by a ToF camera can normally be automatically displayed as two images, an intensity image, example shown as the intensity image 301, and a depth map, example shown as the first depth map 401. The depth map can be used to measure distance and the intensity image can be used to assist in correcting the depth map.

In some embodiments, the first imaging device 110A can be a phase-shift direct ToF camera. Light emitting from the ToF camera can travel to an object 170 and can be reflected back to the ToF camera. Light reflected back from the object 170 to the ToF camera can have a delayed phase from the light that can leave a light source in the ToF camera. By detecting this phase shift, a distance from the ToF camera and the object 170 can be calculated. Taking FIG. 2 as an example, the first imaging device 110A, if provided as the ToF camera, can therefore calculate the distance between the ToF camera and the object 170 by measuring a time for the light to travel to and reflect back from the object 170. The first imaging device 110A can also comprise other types of ToF cameras or other types of cameras and/or sensors.

Figure 5:
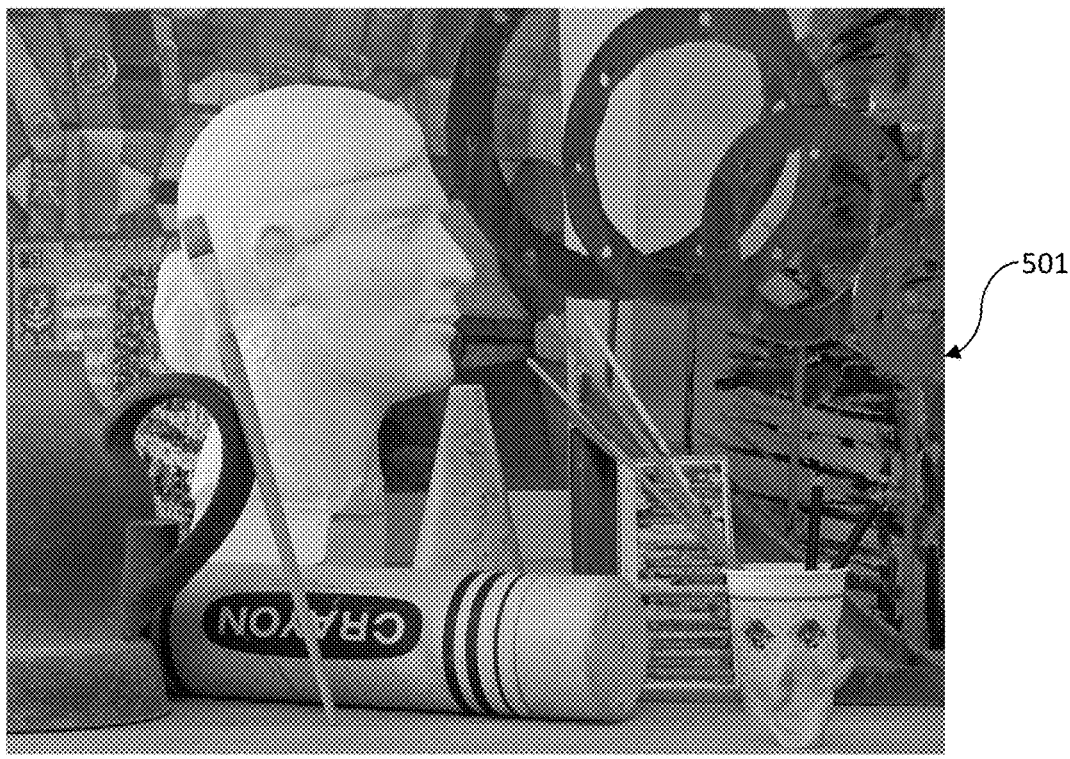
FIG. 5 is an exemplary high-resolution image of the scene captured by the second imaging device of FIG. 2.

The RGB cameras can capture images in full spectrum of light with optical receiving sensors, which can be used for receiving ambient images that can be conventionally represented with respective strength values of three colors: Red; Green; and Blue ("RGB"). Images captured by the RGB cameras normally can have much higher resolution than the images captured by the ToF cameras. An illustrative image captured by the RGB camera, an example of the second imaging device 110B, is shown as the high resolution image 501 (shown in FIG. 5). The image generated by the RGB camera, such as the high resolution image 501, can be a color image with full-spectrum of colors (not shown). The image can be converted into a grayscale image, such as the grayscale image 601. Comparing the intensity image 301 with the grayscale image 601 by the RGB camera, the grayscale image 601 can have a much higher resolution than the intensity image 301.

Figure 18:
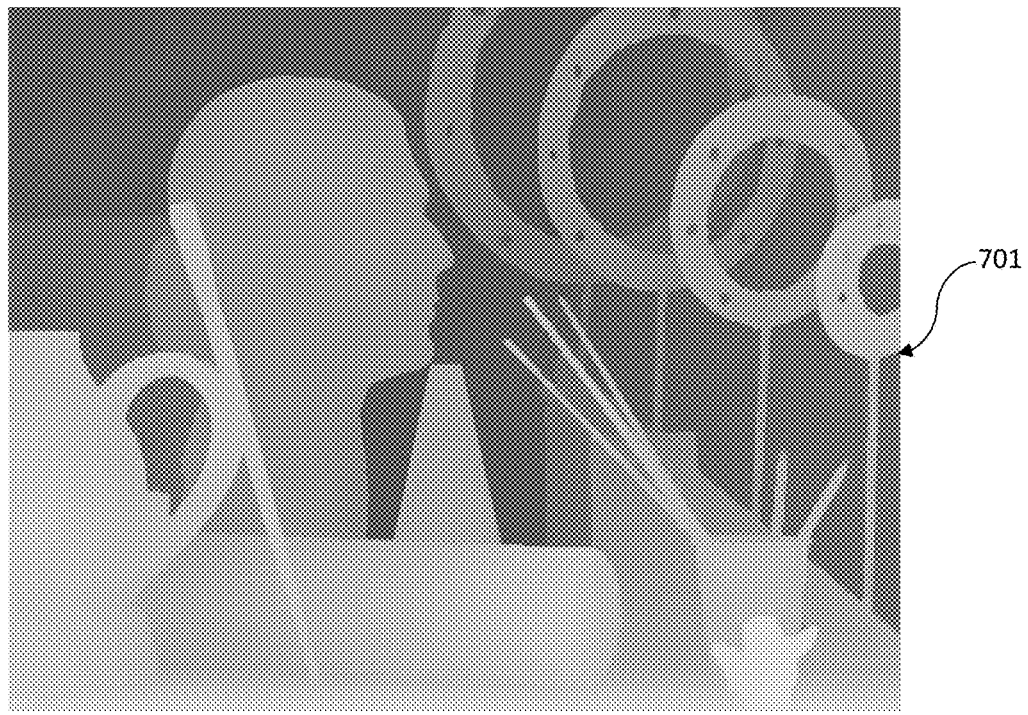
FIG. 18 is an exemplary high-resolution depth map of the scene generated based on the low-resolution depth map of FIG. 4.

Exemplary images of the same object 170 in the same scene 175 are illustrated as the intensity image 301, the first depth map 401, and the second depth map 701 (shown in FIG. 18). The intensity image 301 illustrates an exemplary low resolution intensity image of the object 170. The first depth map 401 can be the depth map of the object 170; whereas, the grayscale image 601 illustrates an exemplary grayscale image. In the examples, the exemplary images are shown as being captured from a common angle. In practice, the images generated from different cameras such as the first imaging device 110A and the second imaging device 110B (collectively shown in FIG. 2) normally can have slightly different angles. Even though the first imaging devices 110A and the second imaging device 110B can be located close to each other physically, the lenses of the respective first or second imaging devices 110A, 110B can be positioned at slightly different angles relative to the object 170 in the scene 175. Such deviations can be corrected by calibrating the first and second imaging devices 110A, 110B thus all the images have the same coordinates. This calibration can normally be performed by the processor 130, which calibration will be shown and described in additional detail below with reference to FIG. 16. In some embodiments, the coordinates of the first imaging device 110A can be used for all images after calibration.

The images can then be processed by the processor 130 in a manner to enhance the resolution of the first depth map 401 (shown in FIG. 4) generated by the first imaging device 110A. The method to enhance the resolution of the first depth map 401 by the first imaging device 110A will be illustrated and explained below in detail, and also shown in FIGS. 15-20.

Although shown and described with reference to FIG. 2 as comprising two imaging devices 110A, 110B for purposes of illustration only, the imaging apparatus 100 can comprise any suitable number of imaging devices. For example, the imaging apparatus 100 can have 2, 3, 4, 5, 6, or even a greater number of imaging devices.

Figure 7:
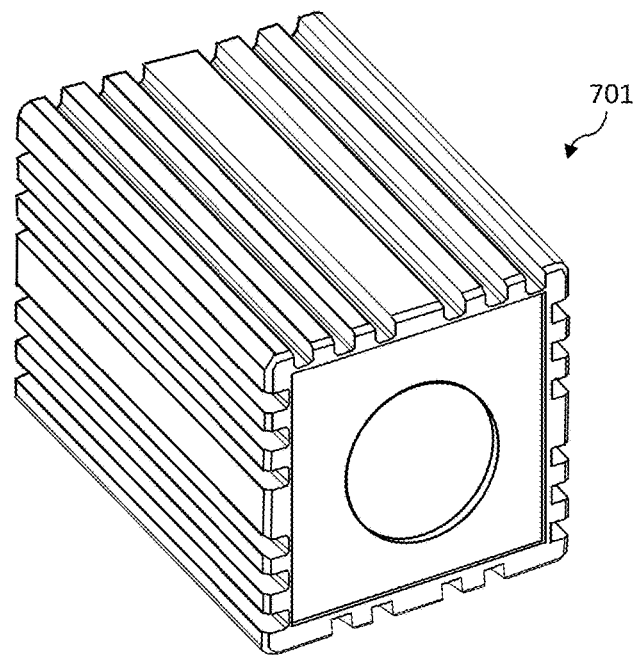
FIG. 7 is an exemplary schematic diagram, illustrating an alternative embodiment of the first imaging device of FIG. 2, wherein the first imaging device comprises a ToF camera.

As discussed above, an example of the first imaging device 110A can be a ToF camera. FIG. 7 shows an illustration of an embodiment of the ToF camera 701. The ToF camera 701 can use a phase shift method to calculate a distance between the object 170 and a camera sensor. There are many other types of ToF cameras that are either commercially available or soon to be available. Each of them, however, could be used as the first imaging device 110A in the apparatus 100.

Figure 8:
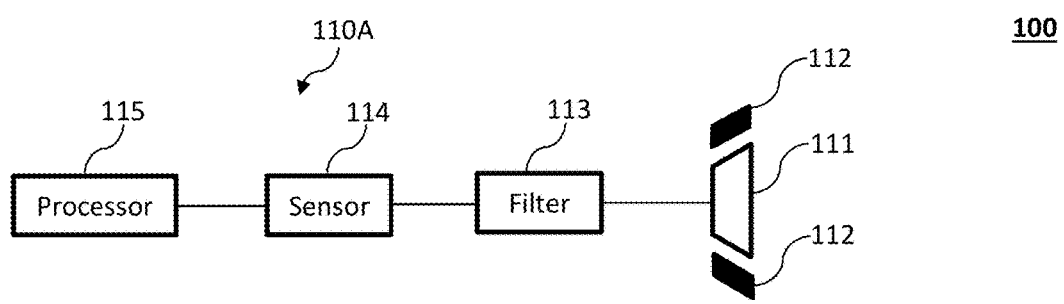
FIG. 8 is an exemplary top-level diagram, illustrating another alternative embodiment of the first imaging device of FIG. 2, wherein the first imaging device comprises a filter and/or an image sensor.

As depicted in FIG. 8, the first imaging device 110A comprises a lens 111, a light source 112, a filter 113, an image sensor 114, and/or a processor 115. Light source 112 can send light to the scene 175 (shown in FIG. 2). The light reflected from the object 170 (shown in FIG. 2) in the scene 175 can come back to the lens 111. The lens 111 can be configured to focus the light onto the filter 113. The filter 113 can remove unwanted light and can pass the remaining light to the image sensor 114 for generating images of the scene 175. The processor 115 can then process the images and produce an intensity image, such as the intensity image 301 (shown in FIG. 3), and a depth map, such as the first depth map 401 (shown in FIG. 4).

An example of the lens 111 can be a digital single-lens reflex ("DSLR") lens; however, the lens 111 can comprise any conventional type of lens. Exemplary suitable lenses as the lens 111 can include one or more of a pin-hole lens, a biological lens, a simple convex glass lens, or the like, without limitation. Additionally and/or alternatively, the lens 111 can be configured with certain imaging properties such as one or more of a macro lens, zoom lens, telephoto lens, fisheye lens, wide-angle lens, or the like, without limitation.

The light source 112 can comprise any conventional light source, including a light emitting diode ("LED") and/or a laser diode. The light emitted from the light source 112 can be visible light, infrared and/or near-infrared light. The light source 112 can be located at any suitable location on the first imaging device 110A and, in some embodiments, is located close to the lens 111. The lens 111 thus can receive a direct reflection of the light coming back from the object 170 and the scene 175. In one embodiment, the lens 111 and the light source 112 can be can be co-localized such that the light source 112 emits a ring of light (not shown) around the lens 111. In this manner, the light source 112 can be close to the lens 111, and the light can be evenly distributed. The emitted light can be pulsed, phase modulated, and/or frequency-modulated. In some embodiments, the emitted light can be phase-modulated.

The filter 113 can be an optical filter that can selectively allow light in a particular range of wavelengths to pass while blocking light with other wavelengths. The filter 113 can comprise any suitable type of filter, including, but not limited to, an absorptive filter, a dichroic filter, a monochromatic filter, an infrared filter, an ultraviolet filter, a long-pass filter, a band-pass filter, a short-pass filter, a guided-mode resonance filter, a metal mesh filter, a polarizer, etc. The filter 113 can comprise, for example, a band-pass filter that can pass light having a predetermined wavelength that is the same as a wavelength of the light emitted by the light source 112. If the light source 112 produces an infrared and/or near infrared light, the filter 113 can filter the ambient visible and ultraviolet light from an environment. Dominating the outdoor environment during daylight hours, visible light and ultraviolet light can be removed to avoid saturation of the image sensor 114 of the imaging apparatus 100. This can be particularly useful when the imaging apparatus 100 is used outdoors during daylight hours.

The image sensor 114 can receive the light from the filter 113 and form an image based on the light received. The image sensor 114 can be a charge coupled sensor ("CCD"), complementary metal-oxide-semiconductor ("CMOS") sensor, N-type metal-oxide-semiconductor ("NMOS") sensor, and hybrids/variants thereof, an electro-optical sensor, a thermal/infrared sensor, a color or monochrome sensor, a multi-spectral imaging sensor, a spectrophotometer, a spectrometer, a thermometer, and/or an illuminometer. In some embodiments, where the imaging apparatus 100 is a ToF camera, the image sensor 114 usually can pair with particular type of the light source 112. For example, a RF-modulated pulsed LED light source normally can be used with a phase detector. In another example, a pulsed laser light source 112 can be used with a range gated imager. In another example, a direct Time-of-Flight image sensor can be used with single laser pulses.

Similar to the processor 130 (shown in FIG. 2), the processor 115 can comprise any commercially available graphic chip that chips can be used in currently available video equipment. The processor 115 can also be a custom-designed graphic chips specially produced for the imaging apparatus 100. The processor 115 can also comprise additional chips for accelerating rendering of 2D graphics or 3D scenes, MPEG-2/MPEG-4 decoding, TV output, or an ability to connect multiple displays. In one of the embodiments, the processor 115 can operate under a VGA standard. Additionally and/or alternatively, the processor 115 can include one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like. The processor 115 can be configured to perform any of the methods described herein, including but not limited to, a variety of operations relating to image processing. In some embodiments, the processor 115 can include specialized hardware for processing specific operations relating to imaging processing.

The processor 115 can usually be operably connected to the image sensor 114. The connection can be via a hardware or wireless link. The processor 115 can process a raw image received by the image sensor 114 and can convert the raw image automatically into an intensity image, such as the intensity image 301 and a depth map, such as the first depth map 401. The processor 115 may also be linked physically or wirelessly to the processor 125 of the second imaging device 110B (collectively shown in FIGS. 11 and 12), and/or the processor 130 (shown in FIG. 2). As detailed in FIGS. 9, 11 and 12, the one or more processors 115, 125, 130 can calibrate the coordinates of the first imaging device 110A and the second imaging device 110B, analyze the difference between each image block 1110 (shown in FIG. 19) of the intensity image 301, (shown in FIG. 3) and each corresponding image block 1120 (shown in FIG. 19) of the grayscale image 601 (shown in FIG. 6). The one or more processors 115, 125, 130 can also produce a degradation model, and apply a transformation mix, which can be the inverse of the degradation model, to each image block 1210 (shown in FIG. 20) of the first depth map 401, from ToF camera, and create a high resolution depth map.

Figure 9:
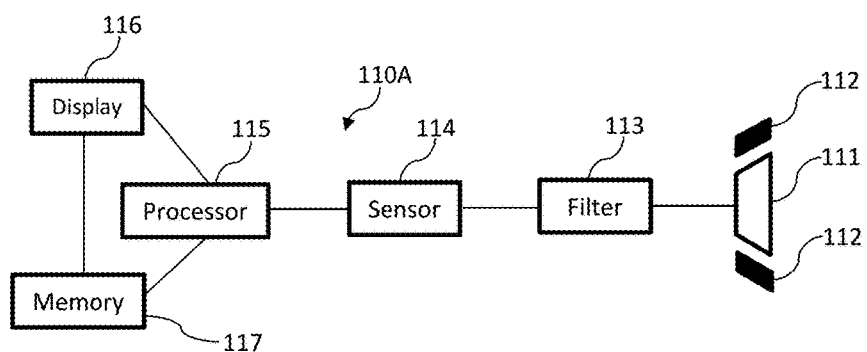
FIG. 9 is an exemplary top-level diagram, illustrating an alternative embodiment of the first imaging device of FIG. 8, wherein the first imaging device comprises a display and/or a memory.

Turing to FIG. 9, a first imaging device 110A can also contain a display 116 and/or a memory 117. The processor 115 (shown in FIG. 8) of the first imaging device 110A can be operatively connected to the display 116, where raw images from the image sensor 114 or processed images from the processer 115 can be presented. A memory 117 can also be optionally included in the first imaging device 110A. The raw images from the image sensor 114 or the processed images from the processor 115 can be stored in the memory 117, either before or after being displayed on the display 116. The display 116 and the memory 117 can be physically associated to other components of the imaging device 110. For example, each or both of the display 116 and the memory 117 can be linked to the processor 115 via wired or wireless connections. Each or both of the display 116 and the memory 117 can also be linked to any other components of the first imaging device 110A, such as the image sensor 114.

Figure 10:
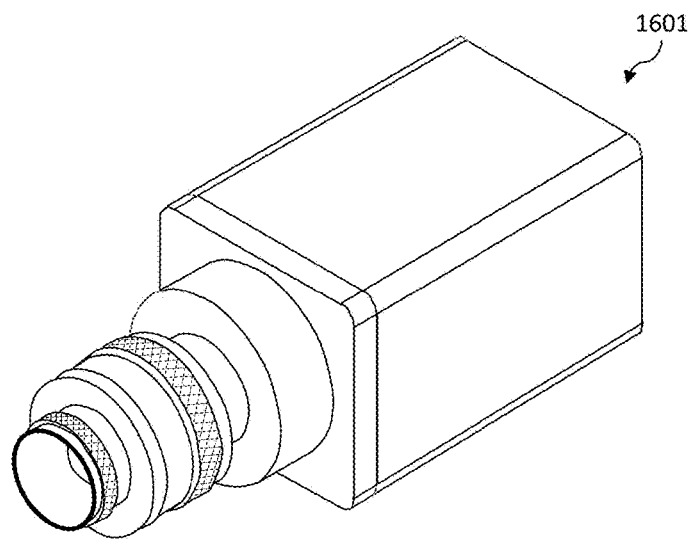
FIG. 10 is an exemplary schematic diagram, illustrating an alternative embodiment of the second imaging device of FIG. 2, wherein the second imaging device comprises a RGB camera.

In some embodiments, the second imaging device 110B of FIG. 2 can comprise a RGB camera. FIG. 10 shows an illustration of an exemplary commercially available RGB camera 1601 made by Image Acquisition. There are many other RGB cameras that are commercially available and can be used as the second imaging device 110B in an apparatus 100. These KGB cameras can capture images with a full spectrum of colors and the images can be produced with relatively high resolutions, such as the grayscale image 601 (shown in FIG. 6).

Figure 11:
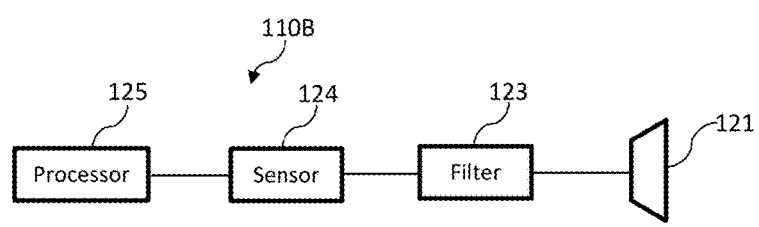
FIG. 11 is an exemplary top-level diagram, illustrating another alternative embodiment of the second imaging device of FIG. 2, wherein the first imaging device comprises a filter and/or an image sensor.

In another embodiment, as depicted in FIG. 11, the second imaging device 110B of FIG. 2 comprises a lens 121, a filter 123, an image sensor 124, and a processor 125. The lens 121 can be configured to focus light onto the filter 123. The filter 123 can remove unwanted light and pass the rest to the image sensor 124 for generating an image. The processor 125 can then process the image and produce a high resolution grayscale image, such as the grayscale image 601 (shown in FIG. 6).

In some embodiments, the lens 121 can be a digital single-lens reflex ("DSLR") lens; however, the lens 121 can comprise any conventional type of lens. Exemplary suitable lens systems for the lens 121 can include one or more of pinhole lenses, biological lenses, simple convex glass lenses, or the like, without limitation. Additionally and/or alternatively, the lens 121 can be configured with certain imaging properties such as one or more of a macro lens, zoom lens, telephoto lens, fisheye lens, wide-angle lens, or the like, without limitation.

The filter 123 can be an optical filter that can selectively transmit light in a particular range of wavelengths. The filter 123 can comprise an absorptive filter, a dichroic filter, a monochromatic filter, an infrared filter, an ultraviolet filter, a long-pass filter, a band-pass filter, a short-pass filter, a guided-mode resonance filter, a metal mesh filter or a polarizer, etc. The filter 123 can comprise, for example, a band-pass filter that can pass light having a predetermined wavelength. If the filter 123 filters ambient visible and ultraviolet light from the environment, visible light and ultraviolet light, which dominates the outdoor environment during daylight hours, can be removed to avoid saturation of the image sensor 124 of the second imaging device 110B. This can be particularly useful when the imaging apparatus 100 is used outdoors during daylight hours.

The second imaging device 110B can also comprise a band-pass filter 123 that substantially filters out light at particular wavelengths, leaving only light in red, green or blue, and the processor 125 can be configured to sense such wavelengths.

The image sensor 124 can receive light from the filter 123 and form an image based on the light received. The image sensor 124 can be a charge coupled sensor ("CCD"), complementary metal-oxide-semiconductor ("CMOS") sensor, N-type metal-oxide-semiconductor ("NMOS") sensor, and hybrids/variants thereof), an electro-optical sensor, a thermal/infrared sensor, a color or monochrome sensor, a multi-spectral imaging sensor, a spectrophotometer, a spectrometer, a thermometer, and/or an illuminometer.

Similar to the processor 130 (shown in FIGS. 1 and 2), the processor 125 can comprise any commercially available graphic chips, made by various manufacturers, which chips are used in currently available video equipment. Alternatively, the processor 125 can also be a custom-designed graphic chips specially produced for the second imaging device 110B. The processor 125 can comprise additional chips that can accelerate the rendering of 2D graphics or 3D scenes, MPEG-2/MPEG-4 decoding, TV output, or an ability to connect multiple displays. In one embodiment, the processor 125 can operate under the VGA standard. Additionally and/or alternatively, the processor 125 can include one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like. The processor 125 can be configured to perform any of the methods described herein, including but not limited to, a variety of operations relating to image processing. In some embodiments, the processor 125 can include specialized hardware for processing specific operations relating to imaging processing.

The processor 125 can usually be operably connected to the image sensor 124. The connection can be via hardware or wireless links. The processor 125 can process a raw image received by the image sensor 124 and convert the raw image automatically into a grayscale image, such as the grayscale image 601 (shown in FIG. 6). The processor 125 can also be connected physically or wirelessly to the processor 115 of the first imaging device 110A, and/or the processor 130. As detailed in FIGS. 16, 19 and 20, the one or more processors 115, 125, 130 can calibrate the coordinates of the first imaging device 110A and the second imaging device 110B, analyze the difference between each image block 1110 (shown in FIG. 19) of intensity image 301 (shown in FIG. 3) and each corresponding image block 1120 (shown in FIG. 19) of the grayscale image 601 (shown in FIG. 6). In addition, the one or more processors 115, 125, 130 can also produce a degradation model and apply a transformation mix, which is the inverse of the degradation model, to each image block 1210 (shown in FIG. 20) of the first depth map 401 (shown in FIG. 4) from a ToF camera, and create a high resolution depth map shown and described with reference to FIGS. 15 and 20.

Figure 12:
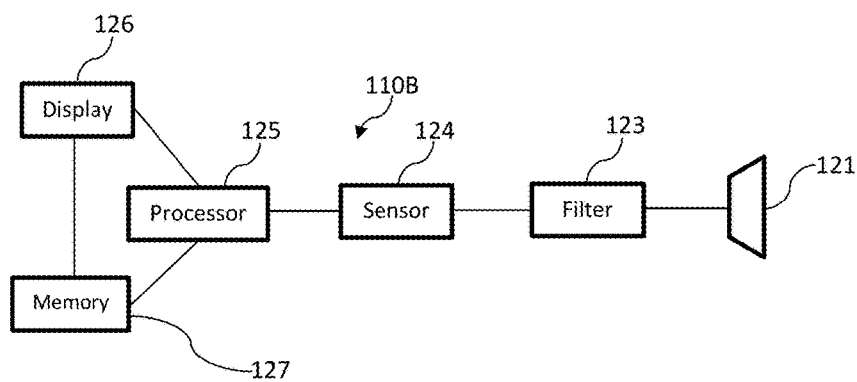
FIG. 12 is an exemplary top-level diagram, illustrating an alternative embodiment of the second imaging device of FIG. 11, wherein the first imaging device comprises a display and/or a memory.

Turing to FIG. 12, in an alternative embodiment, the second imaging device 110B of FIG. 11 can also comprise a display 126 and/or a memory 127. Raw images from the image sensor 124 or processed images from the processor 125 can be presented via the display. A memory 127 can also be optionally included in the embodiment. The raw images from the image sensor 124 or the processed images from the processor 125 can be stored in the memory 127, either before or after being displayed on the display 126. The display 126 and the memory 127 can be physically connected to other components of the second imaging device 110B. For example, each or both of the display 126 and the memory 127 can be connected to the processor 125 via wired or wireless connections. Each or both of the display 126 and the memory 127 can also be connected to other components of the second imaging device 110B. The raw or processed images from the second imaging device 110E can be further processed by the processor 130 using information from other parts of the imaging apparatus 100, such as the first imaging device 110A.

In another embodiment, there can include no processor 130 and all the processing can be conducted by the processor 115 and 125 of the first imaging device 110A and/or the second imaging device 110B respectively.

In some embodiments, there can be provided without the display 116 or 126 for the first and second imaging devices 110A, 110B respectively. In such case, the only display for the apparatus 100 is the display 150, which can display the images with enhanced resolution after being processed. For example, the second imaging device 110B, if provided as a RGB camera, can be provided without the display 126, and the images discussed herein can be sent to the processor 130 directly.

While the imaging apparatus 100 can be used to detect light in visible and/or infrared spectrums and generate images therefrom, in some embodiments, the apparatus 100 can also be adapted to detect light of other wavelengths including, X-rays, microwaves, or the like.

The imaging apparatus 100 can be adapted for still images, video images, and three-dimensional images, or the like. Accordingly, the present disclosure should not be construed to be limiting to the exemplary imaging system 100 shown and described herein.

Although shown and described as including one processor 115, one display 116 and one memory 117 with reference to FIG. 9, and one processor 125, one display 126, and one memory 127 with reference to FIG. 12, for purposes of illustration only, the imaging apparatus 100 can include any predetermined number of processors, memories and/or displays. Alternatively and/or additionally, one or more of the processors, memories and/or displays can be omitted from the imaging apparatus 100 shown and described herein depending upon a system application.

In some embodiments, any of the first and second imaging devices 110A, 110B, the processor 130 can be provided in any suitable plurality.

Figure 13:
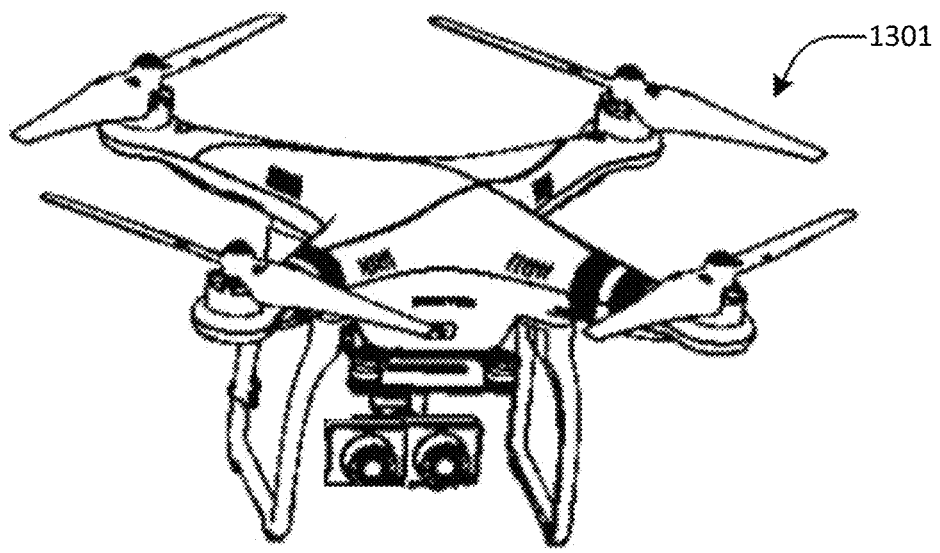
FIG. 13 is an exemplary schematic diagram, illustrating another alternative embodiment of the imaging apparatus of FIG. 2, wherein the imaging apparatus is supported by a mobile platform.

FIG. 13 shows an embodiment of a mobile system 200. The mobile platform 140, shown and described with reference to FIG. 2, is shown as a UAV 1301 comprising motors and propellers. UAVs are aircrafts without a human pilot onboard the vehicle whose flight can be controlled autonomously or by a remote pilot (or sometimes both). UAVs are now finding increasing usages in civilian applications involving various aerial operations, such as data-gathering and/or data-delivery. The present system and methods disclosed herein can be suitable for many types of UAVs including, without limitation, quadcopters (also referred as a quadrotor helicopter or quad rotors), single rotor, dual rotor, trirotor, hexarotor, and octorotor rotorcraft UAVs, fixed wing UAVs, and hybrid rotorcraft-fixed wing UAVs.

In some embodiments, the first and second imaging devices 110A, 110B can be hung under the body of the UAV. The first and second imaging devices 110A, 110B can also be arranged on the top of the UAV 1301, on one side of the UAV 1301, or physically integrated with the UAV 1301. The processor 130 (shown in FIG. 2) can be physically integrated with one of the first and second imaging devices 110A, 110B, or be disposed inside a body of the UAV 1301. Regardless of the location, the processor 130 can be operably connected to the first imaging device 110A, the second imaging device 110B, and/or the mobile platform 140, such as the UAV 1301.

The mobile system 200 can be provided with or without the display 150. If it includes the display 150, the display 150 can be physically attached to the imaging apparatus 100, or remotely and wirelessly connected to the processor 130. For example, many UAVs can use the display of a desktop, laptop, smart phone or tablet, and the display can wirelessly connect with the UAV 1301 via other hardware components.

Figure 14:
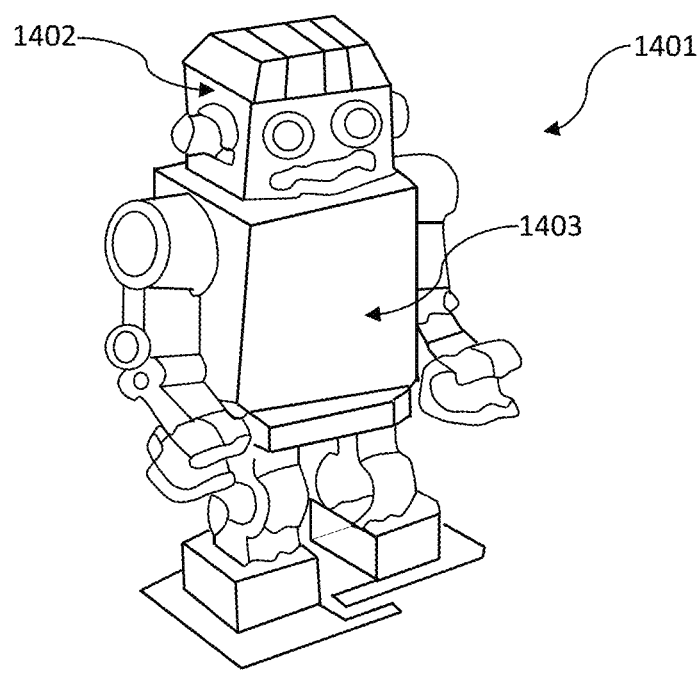
FIG. 14 is an exemplary schematic diagram, illustrating an alternative embodiment of the imaging apparatus of FIG. 13, wherein the mobile platform is a robot.

FIG. 14 shows another embodiment of the mobile system 200 of FIG. 2. The mobile platform 140 is shown as a robot 1401, comprising motors and limbs. In this embodiment, the first imaging device 110A and the second imaging device 110B (collectively shown in FIG. 2) can be arranged on the head 1402 of the mobile system 200, such as the robot 1401. The processor 130 can be disposed inside the body 1403 of the robot 1401 and be operably connected to the first imaging device 110A, the second imaging device 110B, and/or the mobile platform 140. The mobile system 200 can be provided with or without a display 150. If it includes the display 150, the display 150 can be physically attached to an imaging apparatus 100, and/or remotely and wirelessly connected to processor 130. Many recently developed high quality robots use the display of a desktop, laptop, smart phone or tablet, and the display can be wirelessly connected to the robot 1401 via other hardware components.

The mobile platform 140 can also comprise motors and wheels, and/or motors and tracks (neither is shown) etc. to achieve the function of movement. The mobile platform 140 can include, but are not limited to, a bicycle, an automobile, a truck, a ship, a boat, a train, a helicopter, an aircraft, various hybrids thereof, and the like.

Figure 15:
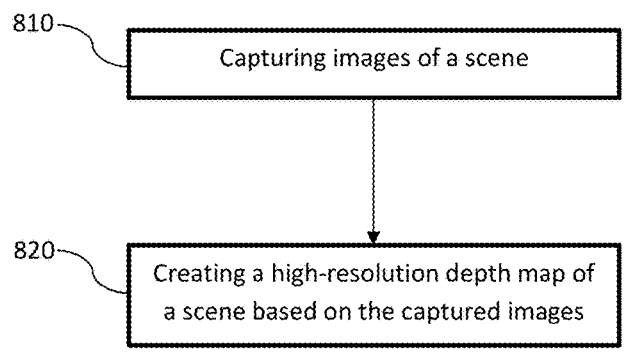
FIG. 15 is an exemplary top-level flow chart illustrating an embodiment of a method for creating a high resolution depth map.

FIG. 15 illustrates an exemplary method 800 for creating a high resolution depth map. The method 800 begins, at 810, where the first and second imaging devices 110A, 110B capture images of the scene 175 (collectively shown in FIG. 2), from slightly different angles. At 820, the processor 130, alone or working with the processors 115 and 125, can create a high resolution depth map of the scene 175 based on the images captured by the first and second imaging devices 110A, 110B.

Figure 16:
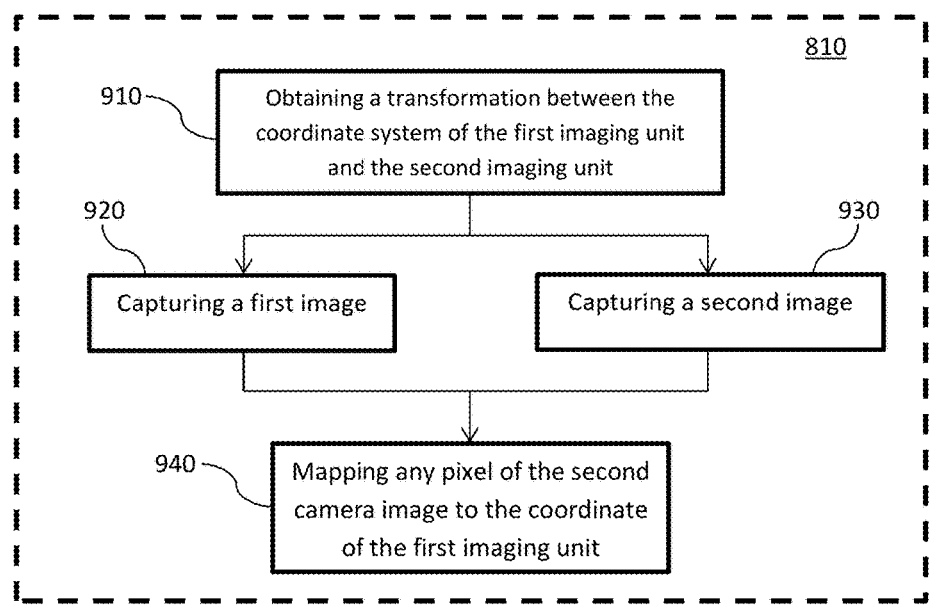
FIG. 16 is an exemplary flow chart illustrating an alternative embodiment of the method of FIG. 15, wherein first and second images of a scene are captured.

FIG. 16 illustrates capturing images at 810 of FIG. 15 with additional details. At 910, the processor 130 (shown in FIG. 2) can calibrate the first imaging device 110A and the second imaging device 110B by obtaining a transformation between a coordinate system of the first imaging device 110A and the second imaging device 110B. At 920, the first imaging device 110A can capture a first image. At 930, the second imaging device 110B can capture a second image 501 (shown in FIG. 5). After calibration, at 940, the processor 130 can map any pixel of the second image captured by the second imaging device 110B to the coordinates of the first imaging device 110A. Thus, the second image 501 can be resampled under the new coordinates, resulting in the first image and the second image can be compared more easily under the same coordinate system.

Figure 17:
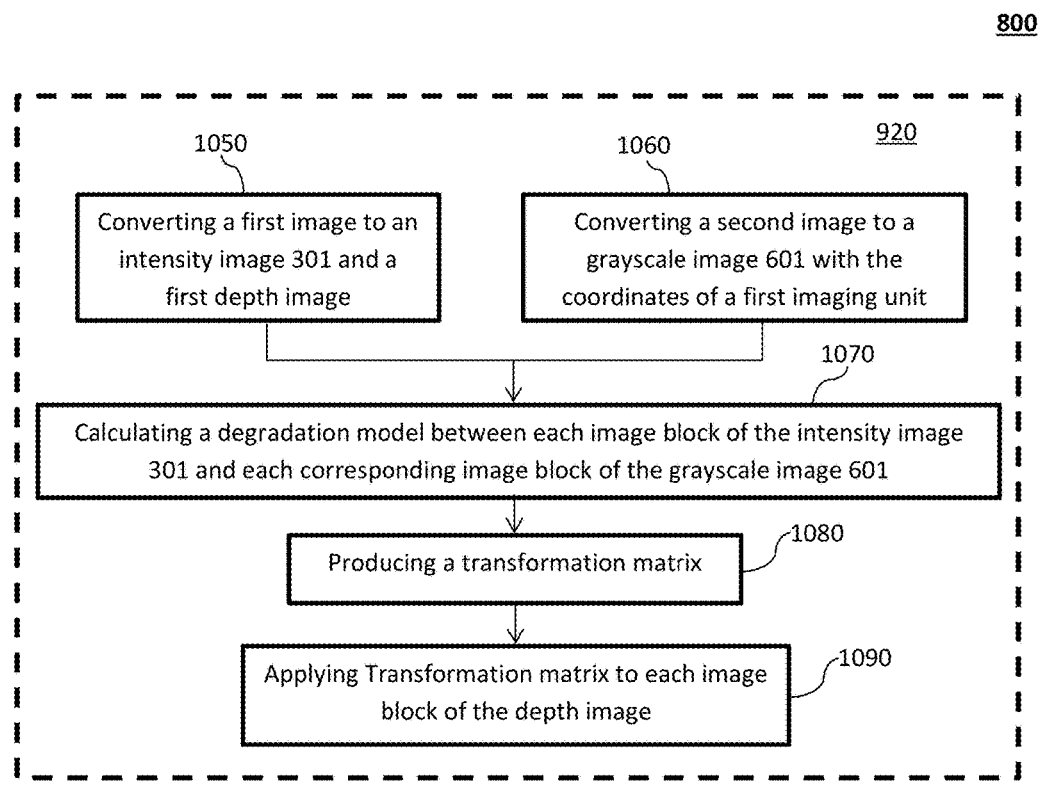
FIG. 17 is an exemplary flow chart illustrating another alternative embodiment of the method of FIG. 15, wherein a degradation model between intensity and grayscale images is calculated and a transformation matrix for creating a high resolution depth map is produced.

Turning to FIG. 17, after capturing the first and second images at 920, 930 and the calibration, at 1050 the processor 115 of the first imaging device 110A can convert the first image to an intensity image 301 (shown in FIG. 3), which is associated with the first image, and a first depth map 401 (shown in FIG. 4). At 1060, the processor 125 of the second imaging device 110B can convert a calibrated image to a grayscale image 601 (shown in FIG. 6), which is associated with the second image. At 1070, the processor 130 can compare the intensity and grayscale images 301, 601 and calculate a degradation model based on a difference between a higher resolution grayscale image 601 and the lower resolution intensity image 301. The intensity image 301 generated from the first imaging device 110A can be of much lower resolution than that of the grayscale image 601 from the second imaging device 110B because of an innate resolution difference between the first and second imaging devices 110A, 110B. For example, in the embodiment where the first imaging device 110A can be a ToF camera and the second imaging device 110B can be a RGB camera, the resolution difference can be at least QVGA v. VGA, about four folds. At 1070, the difference between the intensity image 301 and the grayscale image 601 can be calculated, in the manner described in additional detail below with reference to FIG. 19 and FIG. 20, into a degradation model. Because the first imaging device 110A and the second imaging device 110B can capture images of a same scene 175 at a same time, the degradation suffered by the intensity and grayscale images can be assumed to be directly proportional to the low resolution suffered by the first depth map 401 (shown in FIG. 4). Therefore, at 1080 the processor 130 can produce a transformation matrix that is the inverse of the degradation model. Then, at 1090, the processor 130 can apply the transformation matrix to the low resolution depth map 401 of FIG. 4, to create a high resolution depth map, example shown as a second depth map 701 (shown in FIG. 18).

Figure 19:
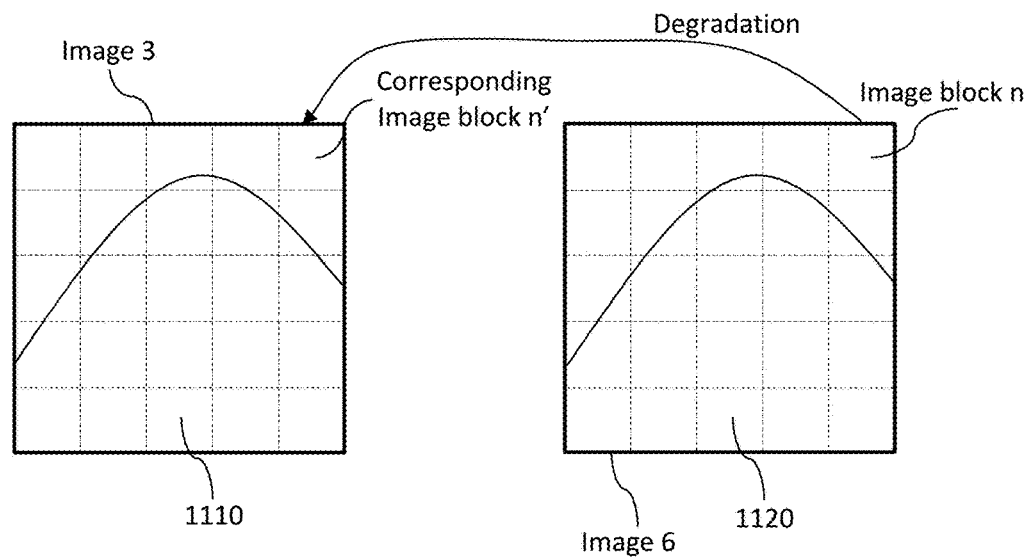
FIG. 19 is an exemplary diagram, illustrating an exemplary implementation of the method of FIG. 17, wherein a degradation model is calculated based on the intensity and grayscale images.

FIG. 19 shows exemplary diagrams illustrating an implementation of the method 800 of FIG. 17 for calculating a degradation model based on a resolution difference between the intensity image 301 (shown in FIG. 3) generated from a first imaging device 110A (shown in FIG. 2) and a grayscale image 601 (shown in FIG. 6) generated from the second imaging device 110B (shown in FIG. 2), FIG. 19 shows exemplary details of calculating a degradation model, at 1070 of FIG. 17. In some embodiments, the first imaging device 110A can be a ToF camera and the second imaging device 110B can be a RGB camera. Under coordinates of the ToF camera, the processor 130 can calculate a difference of each pairs of corresponding image blocks. The result can be the degradation model. In the degradation model, i represents an index of each of the image blocks, which are illustrated as the small rectangles bordered by dotted lines. Each small rectangle can be an image block, such as 1120. Each image block in 1120 can be identified as n. Each corresponding block in 1110 is identified as n'. One or more of the processors 115, 125,130 can calculate the difference between n and n', and obtain the degradation model for the pair of image blocks n and n'.

The degradation model illustrates how a low-resolution intensity image block n can be created from a high-resolution grayscale image block n' through a process of blurring and noise generation according to Equation (1):

$$G_i^{TOF} = A_i \cdot G_i^{RGB} + n \qquad \text{Equation (1)}$$

where $A_i$ describes the image degradation (resolution reduction) process, n denotes random noise in imaging. The reason why each image block pair uses different degradation model can be because the degradation process is local and it can be associated with the content of the image, rather than global. For the entire image block pair, one can calculate according to Equation (2):

$$A_i: A_i = \min_A \|A \cdot G_i^{RGB} - G_i^{TOF}\|^2 \qquad \text{Equation (2)}$$

by maximum likelihood process, basically seeking degradation model $A_i$ to make degraded image blocks $A \cdot G_i^{RGB}$ best meet the observation of $G_i^{TOF}$.

Figure 20:
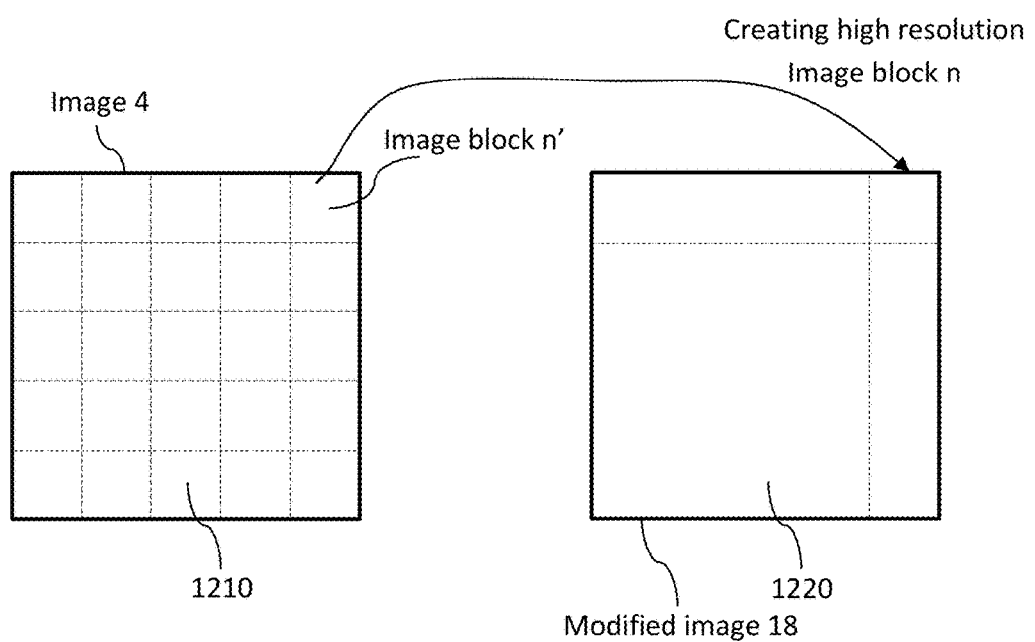
FIG. 20 is an exemplary diagram illustrating another exemplary implementation of the method of FIG. 17, wherein a transformation matrix for creating a high resolution depth map is produced.

FIG. 20 is an exemplary diagram illustrating an implementation of the method 800 of FIG. 17 for producing a transformation matrix to create a high resolution depth map. FIG. 12 shows exemplary details for 1080 and 1090 of FIG. 10. Because the first depth map 401 (shown in FIG. 4) and the intensity image 301 (shown in FIG. 3) can be generated from a same first image, and the first image and the second image can be taken at a same time for the same scene 175, it can be assumed that the degradation model for the depth map can be the same as the intensity image. At 1080, one or more of the processors 115, 125,130 can produce a transformation matrix that is the inverse of the degradation model.

Similar to 1070, each image block pairs n/n' can have a transformation matrix calculated individually. Then, one or more of the processors 115, 125, 130 can apply the transformation matrix to each image block n' of the depth map 1010 to produce a high resolution depth map block n in the depth map 1020. The transformation matrix can be calculated according to Equation (3):

$$D_i^{TOF} = A_i \cdot D_i^{TOF\_HD} + n \qquad \text{Equation (3)}$$

wherein $D_i^{TOF}$ is i-th block of the low resolution depth map blocks by ToF camera, $A_i$ represents the degradation model, n represents a random noise. Thus, calculating a high-resolution depth map block can be obtained at the optimization process according to Equation (4):

$$D_i^{TOF\_HD} = \min_{D_i^{TOF\_HD}} \|A_i \cdot D_i^{TOF\_HD} - D_i^{TOF}\|^2. \qquad \text{Equation (4)}$$

After the above steps are repeated for each image block pairs, a high resolution Tot' depth map, such as the second depth map 701 (shown in FIG. 7), can be obtained.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method for enhancing image resolution comprising:
   capturing a first image of a scene including a first depth map via a first imaging device;
   capturing a second image of the scene via a second imaging device;
   converting the first image into an intensity image associated with the first image and the first depth map;
   converting the second image into a grayscale image associated with the second image;

calculating a relationship between the intensity image associated with the first image and the grayscale image associated with the second image; and enhancing a resolution of the first depth map based upon the relationship to generate a second depth map, wherein the second depth map has a higher resolution than the first depth map.

2. The method of claim 1, wherein the first imaging device includes a Time of Flight ("ToF") camera.

3. The method of claim 1, wherein the second imaging device includes a Red, Green, and Blue (RGB) camera and the second image of the scene includes an RGB image.

4. The method of claim 1, further comprising:
calibrating at least one of the first imaging device and the second imaging device by obtaining a transformation relationship between coordinates of the first and the second imaging devices.

5. The method of claim 1, further comprising:
mapping one or more pixels of the second image to the first image.

6. The method of claim 1, wherein calculating the relationship includes:
analyzing differences between image blocks of the intensity image associated with the first image and corresponding image blocks of the grayscale image associated with the second image; and
producing a degradation model between the image blocks of the intensity image associated with the first image and the corresponding image blocks of the grayscale image associated with the second image.

7. The method of claim 6, wherein enhancing the resolution of the first depth map includes applying a transformation matrix to the image blocks of the first depth map, the transformation matrix being an inverse of a degradation model.

8. An apparatus for imaging resolution enhancing comprising:
a memory storing instructions; and
one or more processors individually or collectively coupled to the memory and configured to execute the instructions to:
capture a first image of a scene including a first depth map via a first imaging device;
capture a second image of the scene via a second imaging device:
convert the first image into an intensity image associated with the first image and the first depth map;
convert the second image into a grayscale image associated with the second image;
calculate a relationship between the intensity image associated with the first image and the grayscale image associated with the second image; and
enhance a resolution of the first depth map based upon the relationship to generate a second depth map,
wherein the second depth map has a higher resolution than the first depth map.

9. The apparatus of claim 8, further comprising:
a first imaging device configured to capture the first image from one or more images of the scene; and
a second imaging device configured to capture the second image from one or more images of the scene.

10. The apparatus of claim 9, wherein the one or more processors are configured to further execute the instructions to calibrate at least one of the first imaging device and the second imaging device by obtaining a transformation relationship between coordinates of the first and second imaging devices.

11. The apparatus of claim 9, wherein the one or more processors are configured to further execute the instructions to map one or more pixels of the second image to one or more pixels of the first image.

12. The apparatus of claim 8, wherein the one or more processors are configured to further execute the instructions to:
analyze a difference between image blocks of the intensity image associated with the first image and corresponding image blocks of the grayscale image associated with the second image; and
produce a degradation model between the image blocks of the intensity image associated with the first image and the corresponding image blocks of the grayscale image associated with the second image.

13. The apparatus of claim 12, wherein the one or more processors are configured to further execute the instructions to enhance the resolution of the first depth map by applying a transformation matrix, which is an inverse of a degradation model, to the first depth map.

14. The apparatus of claim 8, wherein either of the first imaging device or the second imaging device is a camera or a sensor.

15. The apparatus of claim 8, wherein the first and second imaging devices are selected from a group including Red, Green, and Blue ("RGB") cameras, laser cameras, infrared cameras, ultrasound cameras, and Time-of-Flight ("ToF") cameras.

16. The apparatus of claim 15, wherein the first imaging device includes one or more ToF cameras and the second imaging device includes one or more RGB cameras.

* * * * *